(12) United States Patent
Mitchell et al.

(10) Patent No.: US 7,027,245 B2
(45) Date of Patent: Apr. 11, 2006

(54) APPARATUS FOR PROVIDING HEAD AMPLITUDE CHARACTERIZATION USING GAIN LOOPS

(75) Inventors: Chad E. Mitchell, Kasson, MN (US);
Vicki L. Pipal, Rochester, MN (US);
Joey M. Poss, Rochester, MN (US);
Raymond A. Richetta, Rochester, MN (US)

(73) Assignee: Hitachi Global Storage Technologies Netherlands B.V., (NL)

( * ) Notice: Subject to any disclaimer, the term of this patent is extended or adjusted under 35 U.S.C. 154(b) by 0 days.

(21) Appl. No.: 10/837,275

(22) Filed: Apr. 30, 2004

(65) Prior Publication Data

US 2005/0243456 A1    Nov. 3, 2005

(51) Int. Cl.
*G11B 5/09* (2006.01)
(52) U.S. Cl. .................. 360/46; 360/25; 360/31; 360/32; 360/67
(58) Field of Classification Search ........... 360/46, 360/66–68
See application file for complete search history.

(56) References Cited

U.S. PATENT DOCUMENTS

| 4,635,142 | A |   | 1/1987  | Haugland                    |
|-----------|---|---|---------|-----------------------------|
| 4,750,058 | A | * | 6/1988  | Hirt et al. ......... 360/46 |
| 5,375,145 | A | * | 12/1994 | Abbott et al. ...... 375/345 |
| 5,576,906 | A | * | 11/1996 | Fisher et al. ..... 360/77.08|
| 5,737,342 | A | * | 4/1998  | Ziperovich ......... 714/736 |
| 5,854,714 | A | * | 12/1998 | Reed et al. ........ 360/51  |
| 5,886,842 | A | * | 3/1999  | Ziperovich ......... 360/51  |
| 6,369,741 | B1| * | 4/2002  | Demicheli et al. .. 341/155  |
| 6,429,988 | B1| * | 8/2002  | Bhaumik et al. .... 360/46   |
| 6,441,983 | B1| * | 8/2002  | Philpott et al. ... 360/67   |
| 6,476,989 | B1| * | 11/2002 | Chainer et al. .... 360/31   |
| 6,519,103 | B1| * | 2/2003  | Cyrusian .......... 360/46   |
| 6,661,590 | B1| * | 12/2003 | Cyrusian et al. ... 360/32   |
| 6,891,885 | B1| * | 5/2005  | Imaizumi .......... 375/150  |

OTHER PUBLICATIONS

Mary McCarthy, "Peak-to-Peak Resolution Versus Effective Resolution," Analog Devices, Application Note, AN-615, Jul. 11, 2003, pp. 1-2, www.analog.com.
"DC Characterization of an ADC," Pre-Lab, ENTC 351 Lab 7, 1999, http://ee.tamu.edu/~jinseok/entc351/prelab7_1999.pdf.

* cited by examiner

*Primary Examiner*—David Hudspeth
*Assistant Examiner*—Dismery Merceds
(74) *Attorney, Agent, or Firm*—Chambliss, Bahner & Stophel, P.C.; David W. Lynch

(57) ABSTRACT

An apparatus for providing head amplitude characterization using gain loops is disclosed. A variable gain amplifier (VGA) receiving input signals and generates a VGA output signal. A digital-to-analog converter (DAC) circuit provides a desired input signal to the VGA and a gain control loop drives the VGA to gain lock the VGA to the provided desired input signal. An analog-to-digital converter (ADC) provides a digital output representing an ADC code spread in response to the VGA output. A controller drives the DAC to provide the desired input signal to the VGA and generates control signals for controlling the ADC, the controller further determines read head channel amplitude based upon the signal provided to the DAC, the ADC code spread received from the ADC and gain code provided by the gain control loops.

20 Claims, 6 Drawing Sheets

APPARATUS FOR PROVIDING HEAD AMPLITUDE CHARACTERIZATION USING GAIN LOOPS

BACKGROUND OF THE INVENTION

1. Field of the Invention

This invention relates in general to signals read from a data storage medium, and more particularly to an apparatus for providing head amplitude characterization using gain loops.

2. Description of Related Art

Recently developed data storage devices, such as magnetic disk drive devices (i.e., hard disk drives), have increased storage capacity and increased data access speed. With these advantages, magnetic disk drive devices have become widely used as auxiliary memory devices for computer systems. More generally, developments in pulse communications related to these improvements in disk drive technology have recently provided increased speed and reliability in a wide range of pulse communications systems.

The primary features of a magnetic disk drive device that affect storage capacity and access speed are the head, the recording medium, the servo mechanism, the signal processing technique used in the read/write channel, and the like. Among these, signal processing techniques utilizing PRML (Partial Response Maximum Likelihood) detection have greatly contributed to the increased storage capacities and high access speeds seen in modern magnetic disk drive devices.

A read channel circuit in a generic read/write channel circuit of a magnetic disk drive device includes components for initial processing of the analog read signal generated by the read/write head of the device. This processing provides automatic gain control (AGC) amplification, filtering, and equalization, as well as analog-to-digital conversion.

Each read/write head generates or senses electromagnetic fields or magnetic encodings on the magnetic disk as areas of magnetic flux. The presence or absence of flux reversals in the electromagnetic fields represents the data stored on the magnetic disk. A flux reversal is a change in the magnetic flux on contiguous areas of the magnetic disk. The presence or absence of magnetic flux reversals correspond to binary 1's and 0's of a diagnostic input signal. To "write" data onto a magnetic disk, electronic components receive data from a host device and translate the data into magnetic encodings. The head transfers the magnetic encodings onto a portion of the magnetic disk. To "read" data from the magnetic disk, the head is positioned adjacent to the portion of the magnetic disk having the desired magnetic encodings. The head senses and transfers the magnetic encodings from the magnetic disk. The electronic components translate the magnetic encodings into the data, which is transferred to the host device. The host device may be a personal computer or other electronic equipment. The electronic components may apply error detection and correction algorithms to ensure accurate storage and retrieval of data from the magnetic disk. To improve data storage densities on disk drives, magneto resistive and inductive read/write heads have been developed with increased sensitivity to sense smaller amplitude magnetic signals and with increased signal discrimination.

Typically, a hard drive reads data by "peak detection"—detecting a voltage peak created when a flux reversal on a magnetic disk passes underneath the read/write head. However, a partial response maximum likelihood (PRML) algorithm has been developed to improve peak detection as densities and rotational speeds increase. PRML is implemented in the disk drive electronics to interpret the magnetic signals sensed by the read/write heads. PRML disk drives read the analog waveforms generated by the magnetic flux reversals stored on the disk. Rather than look for peak values to indicate flux reversals, PRML digitally samples the analog waveform (the "partial response" portion of the algorithm) and applies signal processing methodologies to determine the bit pattern represented by the waveform (the "maximum likelihood" portion of the algorithm). Accordingly, in a PRML data channel, a normalized readback signal amplitude is required for proper data detection. A variable gain amplifier (VGA) typically is used in the analog signal path for scaling of the readback signal. Known PRML channels require an analog envelope detector circuit to sense the amplitude of the incoming readback signal in order to provide gain corrections to the VGA.

Because of material and manufacturing variations, each head will have a different characteristic signal output level. This level must be normalized by adjusting the head amplifier gain so that the amplitude detection circuits will have the same signal margin. In order to properly perform this normalization adjustment, a specially recorded tape, with a precisely known recorded amplitude, must be used.

In some systems, these problems have been solved by providing a gain adjustment on the amplifier, which must be readjusted periodically, and by providing different signal amplitude detection threshold levels for each combination of read/write, speed and density. These threshold levels were fixed, however, and could not change to adjust for media coating type, wear, or signal degradation over time. Also, these fixed threshold values required that the output of each magnetic head be normalized very precisely by adjusting its amplifier gain before amplitude detection can be reliable.

Amplitude sensing is an important part of the read circuitry of tape systems for digital data recording, which record multiple tracks in parallel across the tape. In this type of system, error detection and correction methods are used extensively, such as parity checking across the parallel tracks or parity checking of the data bits in a single track. Loss of amplitude is an important indicator that a track is in error, and the correction methods can then be used to correct the track to avoid having to reposition and read the data again.

PRML electronics are used to calibrate and tune the PRML read/write channel. For example, calibration of the VGA gain is necessary to ensure accurate data detection and to provide insight as to the integrity and operating condition of a read transducer. To calibrate the VGA gain, a readback signal is provided to the VGA in the read channel. A voltage signal associated with a loop gain of the amplification circuitry may then be sensed and compared with a number of control voltage signals that correspond to digital word values. The digital word values are associated with a control voltage signal equal to the sensed voltage signal representing the relative amplitude of the readback signal. Gain characteristics of the VGA may then be determined by applying reference voltage signals associated with corresponding pre-established gain values to the signal input of the gain modifying amplifier. A control voltage signal may be selectively applied to the amplifier for each of the reference voltage signals until the amplifier output voltage signal is substantially equal to a pre-established reference voltage signal.

To simplify calibration procedures, many hard drives include an additional digital to analog converter (DAC) and an additional analog to digital converter (ADC) for diagnostic testing of the read/write channel. These DAC and ADC are in addition to the other digital to analog converters and analog to digital converters used to perform the reading and writing operations in the read/write channel. However, these ADC designs increase the hardware requirements and thus the size and costs of the read/write channel. Further, measuring the amplitude of a head in a storage device, such as a disk drive, is difficult because factors such as temperature change, head wear, etc. adversely affect the accuracy of readback signal amplitude estimates.

A logic controller may be used to control the VGA gain and correlate a known input signal to a selectable ADC output code. However, correlation of the characterization values with the actual VGA gain code from the gain loops is still a problem.

It can be seen that there is a need for an apparatus for providing head amplitude characterization using gain loops.

SUMMARY OF THE INVENTION

To overcome the limitations in the prior art described above, and to overcome other limitations that will become apparent upon reading and understanding the present specification, the present invention discloses an apparatus for providing head amplitude characterization using gain loops.

The present invention solves the above-described problems by using a DAC to apply known signals to a variable gain amplifier in the front end of a read channel. A controller determines read head channel amplitude based upon the signal provided to the DAC, the ADC code spread received from the ADC and gain code provided by the gain control loops.

A data channel in accordance with the principles of the present invention includes a variable gain amplifier (VGA) for receiving input signals and generating a VGA output, a digital-to-analog converter (DAC) circuit, coupled to the VGA, for providing a desired input signal to the VGA, a gain control loop, coupled to the VGA, for driving the VGA to gain lock the VGA to the provided desired input signal, an analog-to-digital converter (ADC), coupled to the VGA, for providing a digital output representing an ADC code spread in response to the VGA output and a controller, coupled to the VGA, for driving the DAC to provide the desired input signal to the VGA and generating control signal for controlling the ADC, the controller further determining read head channel amplitude based upon the signal provided to the DAC, the ADC code spread received from the ADC and gain code provided by the gain control loop.

In another embodiment of the present invention, an analog front end for a read channel is provided. The analog front end includes an analog processing circuit for receiving read signals, a digital-to-analog converter (DAC), coupled to the analog processing circuit for providing high and low control signals to the analog processing circuit for producing predetermined analog processing circuit output signals, a variable gain amplifier (VGA), coupled to the analog processing circuit, for processing the predetermined analog processing circuit output signals using VGA gain codes for producing amplified signals, an analog-to-digital converter (ADC), coupled to the VGA, for producing an ADC code spread in response to the amplified signals, gain control loop, coupled to the VGA, for driving the VGA to gain lock the VGA to the input signals from the DAC, memory for storing an amplitude of two input signals, the ADC code spread associated with the two input signals and two VGA gain codes from the gain control loop associated with the two input signals and corresponding high and low DAC control signals and a processor, coupled to the memory, for calculating an amplitude of any input signal using an equation derived from the amplitude of the two input signals, the ADC code spread associated with the two input signals and the two VGA gain codes from the gain control loop.

In another embodiment of the present invention, a magnetic storage device is provided. The magnetic storage device includes a magnetic storage medium for recording data thereon, a motor for moving the magnetic storage medium, a head for reading and writing data on the magnetic storage medium, an actuator for positioning the head relative to the magnetic storage medium and a data channel for processing encoded signals on the magnetic storage medium, the data channel includes a variable gain amplifier (VGA) for receiving input signals and generating a VGA output, a digital-to-analog converter (DAC) circuit, coupled to the VGA, for providing a desired input signal to the VGA, gain control loop, coupled to the VGA, for driving the VGA to gain lock the VGA to the provided desired input signal, an analog-to-digital converter (ADC), coupled to the VGA, for providing a digital output representing an ADC code spread in response to the VGA output and a controller, coupled to the VGA, for driving the DAC to provide the desired input signal to the VGA and generating control signal for controlling the ADC, the controller further determining read head channel amplitude based upon the signal provided to the DAC, the ADC code spread received from the ADC and gain code provided by the gain control loop.

In another embodiment of the present invention, a data channel is provided. The data channel includes means for amplifying an input signal, means, coupled to the means for amplifying, for providing a desired input signal to the means for amplifying, means, coupled to the means for amplifying, for driving the means for amplifying to gain lock the means for amplifying to the provided desired input signal, means, coupled to the means for amplifying, for providing a digital output representing an ADC code spread in response to the amplified input signal and means, coupled to the means for amplifying, for driving the means for providing a desired input signal and for generating control signals for controlling the means for providing a digital output, the means for providing a desired input signal and for generating control signals determining read head channel amplitude based on the ADC code spread and gain codes provided by the means for driving the means for amplifying.

In another embodiment of the present invention, a magnetic storage device is provided. The magnetic storage device includes means for recording data thereon, means for moving the means for recording data, means for reading and writing data on the means for recording data, means for positioning the means for reading and writing relative to the means for recording data and means for processing encoded signals from the means for recording, the means for processing encoded signals including means for amplifying an input signal, means, coupled to the means for amplifying, for providing a desired input signal to the means for amplifying, means, coupled to the means for amplifying, for driving the means for amplifying to gain lock the means for amplifying to the provided desired input signal, means, coupled to the means for amplifying, for providing a digital output representing an ADC code spread in response to the amplified input signal and means, coupled to the means for amplifying, for driving the means for providing a desired input signal and for generating control signals for controlling the means for providing a digital output, the means for providing a desired input signal and for generating control signals determining read head channel amplitude based on the ADC code spread and gain codes provided by the means for driving the means for amplifying.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides an apparatus for providing head amplitude characterization using gain loops. The present invention uses a gain control loop to drive a VGA to gain lock the VGA to the provided desired input signal. An analog-to-digital converter (ADC) provides a digital output representing an ADC code spread in response to the VGA output. A controller drives the DAC to provide the desired input signal to the VGA and generates control signals for controlling the ADC, the controller further determines read head channel amplitude based upon the signal provided to the DAC, the ADC code spread received from the ADC and gain code provided by the gain control loops.

Figure 1:
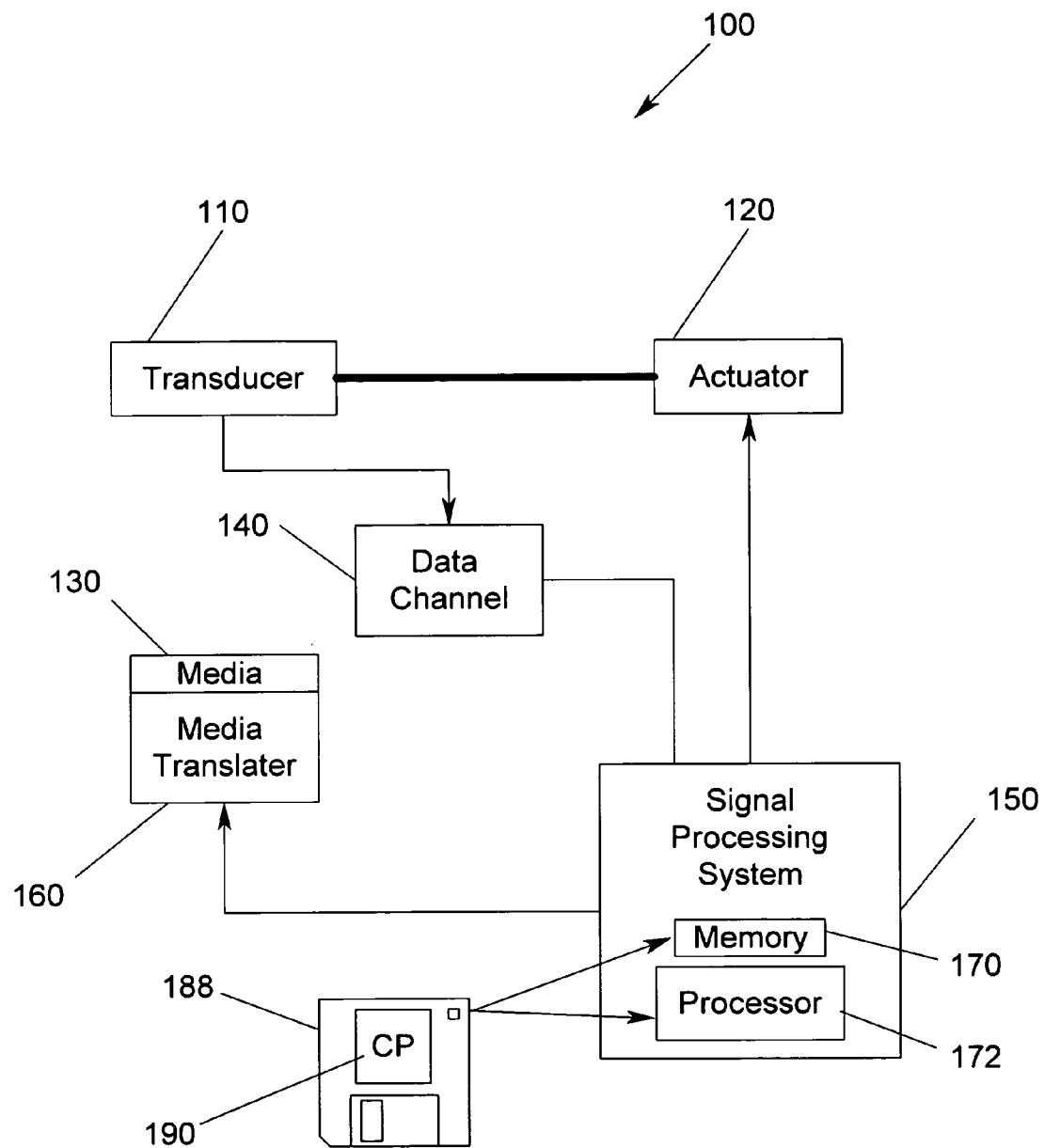
FIG. 1 illustrates a storage system according to an embodiment of the present invention.

FIG. 1 illustrates a storage system 100 according to an embodiment of the present invention. In FIG. 1, a transducer 110 is under control of an actuator 120. The actuator 120 controls the position of the transducer 110. The transducer 110 writes and reads data on magnetic media 130. The read/write signals are passed to a data channel 140. A signal processor system 150 controls the actuator 120 and processes the signals of the data channel 140. In addition, a media translator 160 is controlled by the signal processor system 150 to cause the magnetic media 130 to move relative to the transducer 110. Nevertheless, the present invention is not meant to be limited to a particular type of storage system 100 or to the type of media 130 used in the storage system 100.

Figure 2:
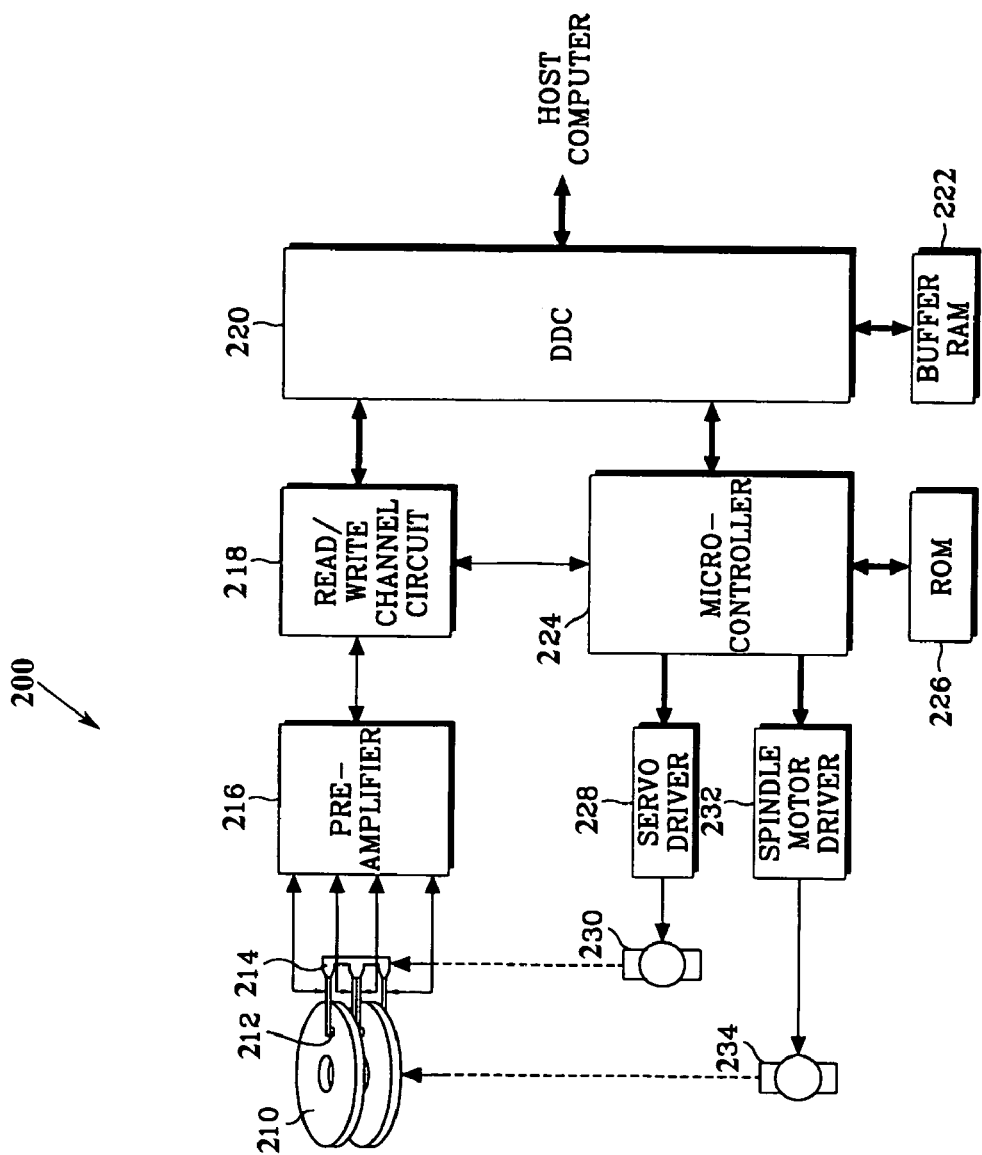
FIG. 2 is a block diagram of a magnetic disk drive device according to an embodiment of the present invention.

FIG. 2 is a block diagram of a magnetic disk drive device 200 according to an embodiment of the present invention. In FIG. 2, disks 210 are rotated by a spindle motor 234, and heads 212 are positioned at surfaces of disks 210. Heads 212 are mounted on corresponding servo arms that extend from an E-shaped block assembly 214 to disks 210. Block assembly 214 has an associated rotary voice coil actuator 230 that moves block assembly 214 and thereby changes to positions of heads 212 for reading data from or writing data to a specified position on one or more disks 210.

A pre-amplifier 216 pre-amplifies a signal picked up by heads 212 and thereby provides read/write channel circuit 218 with an amplified signal during a reading operation. During a write operation, pre-amplifier 216 transfers an encoded write data signal from the read/write channel circuit 218 to heads 212. In a read operation, read/write channel circuit 218 detects a data pulse from a read signal provided by pre-amplifier 216 and decodes the data pulse. Read/write channel circuit 218 transfers the decoded data pulse to a disk data controller (DDC) 220. Furthermore, read/write channel circuit 218 also decodes write data received from the DDC 220 and provides the decoded data to pre-amplifier 216.

DDC 220 both writes data received from a host computer (not shown) onto disks 210, through read/write channel circuit 218 and pre-amplifier 216, and transfers read data from disks 210 to the host computer. DDC 220 also interfaces between the host computer and a microcontroller 224. A buffer RAM (Random Access Memory) 222 temporarily stores data transferred between DDC 220 and the host computer, microcontroller 224, and read/write channel circuit 218. Microcontroller 224 controls track seeking and track following functions in response to read and write commands from the host computer.

A ROM (Read Only Memory) 226 stores a control program for microcontroller 224 as well as various setting values. A servo driver 228 generates a driving current for driving actuator 230 in response to a control signal, generated from microcontroller 224 that provides control of the position of heads 212. The driving current is applied to a voice coil of actuator 230. Actuator 230 positions heads 212 relative to disks 210 in accordance with the direction and amount of the driving current supplied from servo driver 228. A spindle motor driver 232 drives spindle motor 234, which rotates disks 210, in accordance with a control value generated from microcontroller 224 for controlling disks 210.

Figure 3:
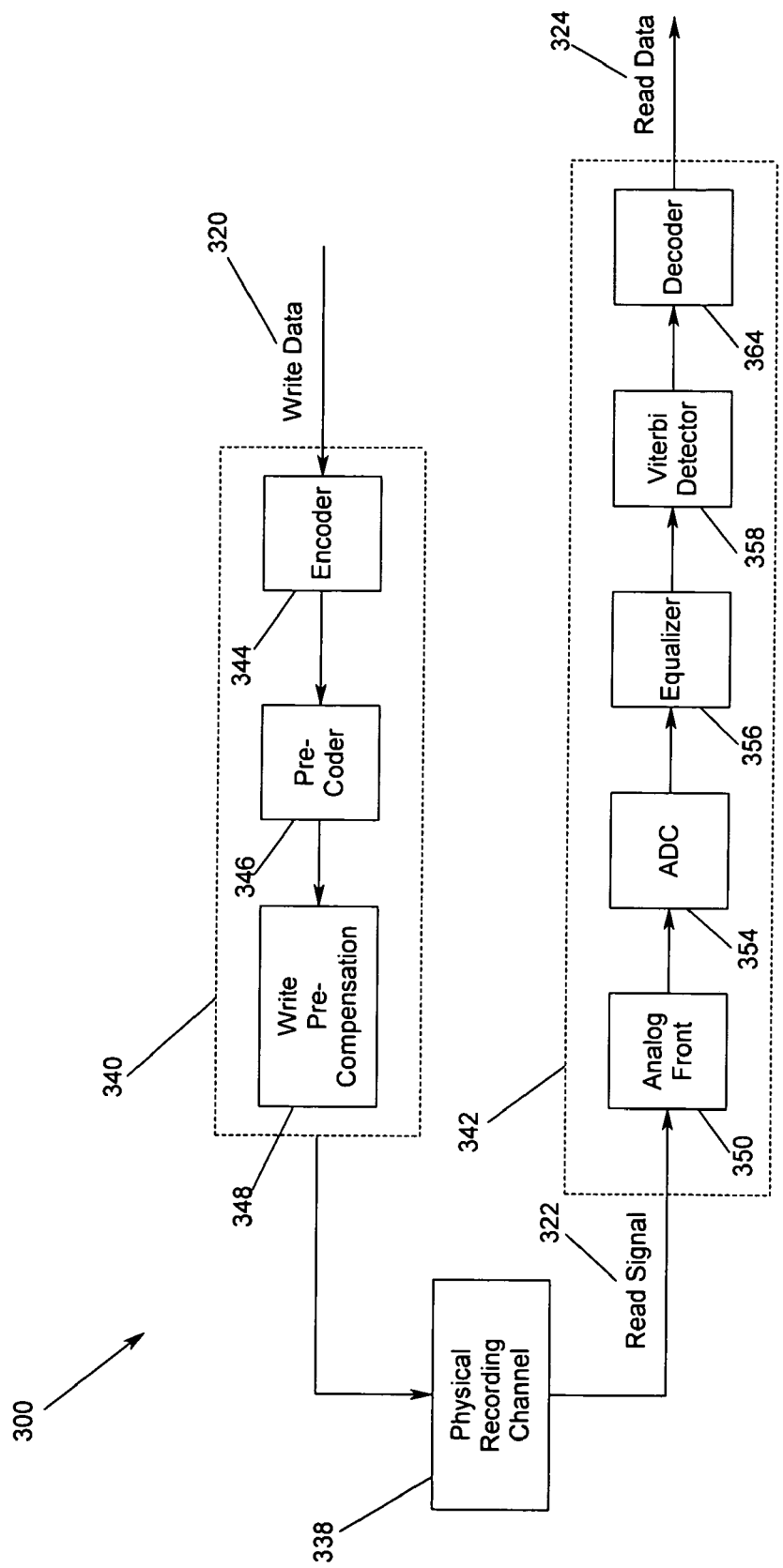
FIG. 3 is a block diagram of a read/write channel circuit of FIG. 2.

FIG. 3 is a block diagram of a read/write channel circuit 300 of FIG. 2. In FIG. 3, the read/write channel circuit 300 includes a physical recording channel 338 having a read/write means and a recording medium, a write channel circuit 340 for writing data onto the recording medium, and a read channel circuit 342 for reading data from the recording medium. Write channel circuit 340 is composed of an encoder 344, a pre-decoder 346, and a write compensator 348. Read channel circuit 342 includes an analog front end 350, an analog-to-digital converter (ADC) 354, an equalizer 356, a Viterbi detector 358 and a decoder 364.

In operation, encoder 344 encodes write data 320, input to be written onto the recording medium, into a predetermined code. For example, an RLL (Run Length Limited) code, in which the number of adjacent zeros must remain between specified maximum and minimum values, is commonly used for this predetermined code. However, the present invention is not meant to be limited to RLL and other coding may be used. Pre-decoder 346 is included to prevent error propagation. Write compensator 348 reduces non-linear influences arising from the read/write head. However, because the response of the actual recording channel does not exactly coincide with this transfer function, some subsequent equalization is always required.

Analog front end 350 amplifies an analog signal 322 read from the disk. The signal output from the analog front end 350 is converted into a discrete digital signal by analog-to-digital (A/D) converter 354. The resulting digital signal is then applied to equalizer 356, which adaptively controls inter-symbol interference (ISI) to generate desired waveforms. Viterbi detector 358 receives the equalized signal output from equalizer 356 and from it generates encoded data. Decoder 364 decodes the encoded data output from Viterbi detector 358 to generate the final read data 324.

Figure 4:
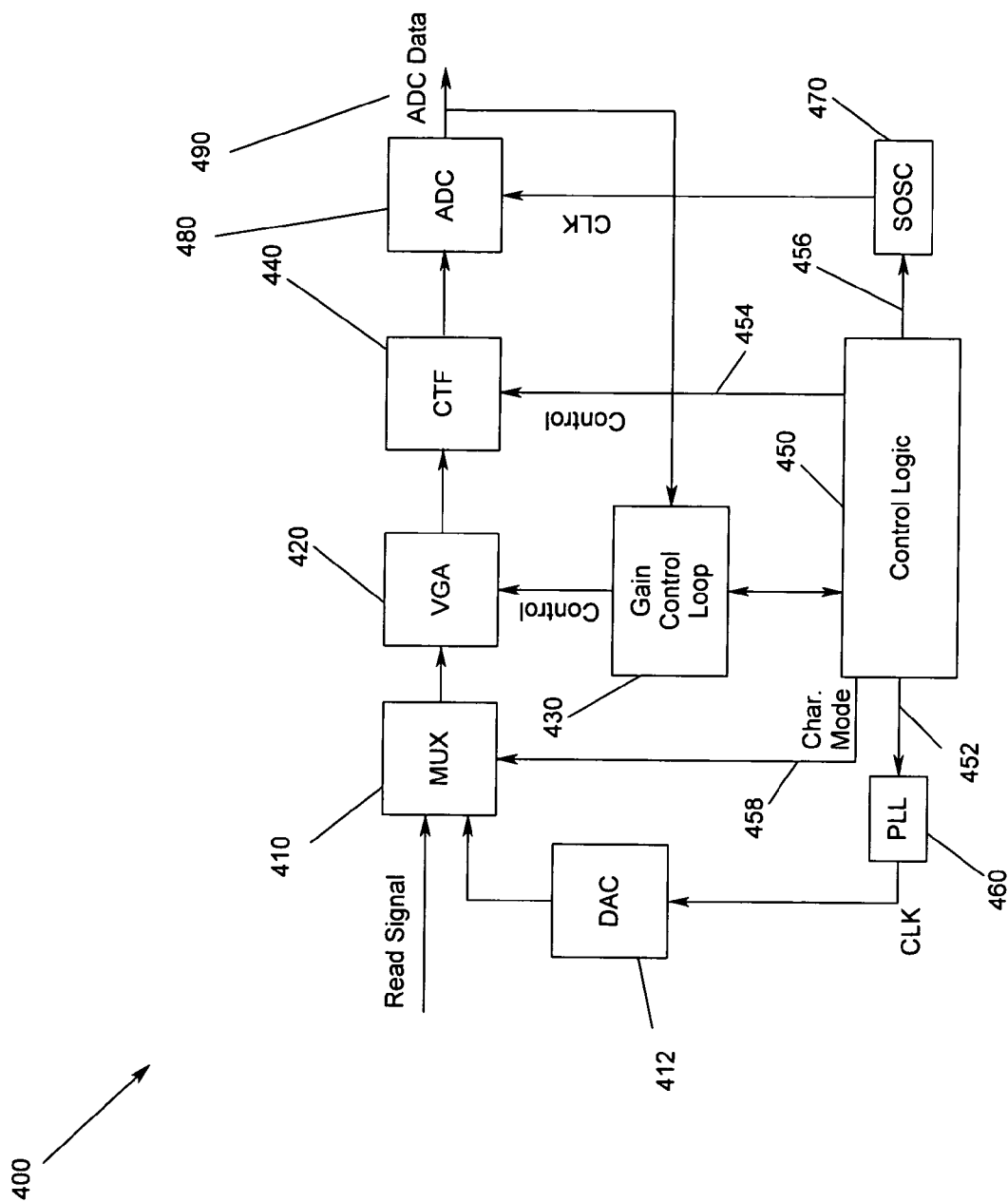
FIG. 4 is block diagram representing the analog sub blocks and control logic of a read channel according to an embodiment of the present invention.

FIG. 4 is block diagram representing the analog sub blocks and control logic of a read channel 400 according to an embodiment of the present invention. An analog switch or multiplexor 410 is provided for switching between inputs. One of the inputs is the read signal. A DAC 412 is provided at the input of the multiplexor 410. According to an embodiment of the present invention, a DAC is used to calibrate read channel analog circuit by using the DAC 412 to create an analog signal of a known amplitude and known frequency. Thus, the DAC 412 may be used to send a known signal through the read channel 400.

A variable gain amplifier (VGA) 420 receives an input signal of known amplitude and frequency that is provided by the multiplexor 410 based on the input from the DAC 412. The VGA input signal is driven into the VGA 420 and then gain locked through the entire read path to a set ADC code spread. The VGA gain code for this signal amplitude is determined. The amplified signal from the VGA 420 is passed to a continuous time filter (CTF) 440. The CTF 440 is configured to filter out noise. The output of the CTF 440 is provided to drive the ADC 480.

Gain loops 430 receive the ADC output data 490 and provide control signals for controlling the VGA 420. Control logic 450 includes a peak-to-peak detector circuit (not shown) that measures the ADC output code via the gain control loops 430. The control logic 450 provides control signals 452, 454, 456 to the CTF 440, phase-locked loop 460 and switchable oscillator (SOSC) 470. The DAC 412 is clocked via the phase-locked loop 460 and the ADC is clocked by the SOSC 470. The control logic 450 also provides a selection signal 458 to the multiplexor 410 for selecting the characterization mode. Accordingly, the control logic 450 sets up the inputs into the read channel thereby allowing the resulting ADC code to be measured.

The two characterization results for data and for servo, which correspond to the VGA gain for the two characterization amplitudes, together with either the data or servo VGA gain, allow a series of calculations to be performed, for example by a signal processing system 150 of FIG. 1, a controller 224 of FIG. 2 and/or control logic 430, to determine the channel input amplitude. From the read ADC output codes 490, the amplitude of the input signal to the VGA 420 may be extrapolated and the ADC code spread converted to amplitude of ADC output using the $ADC_{peak-to-peak}$ code. The control logic 450 correlates the Gain Threshold to a given $ADC_{peak-to-peak}$ code.

Figure 5:
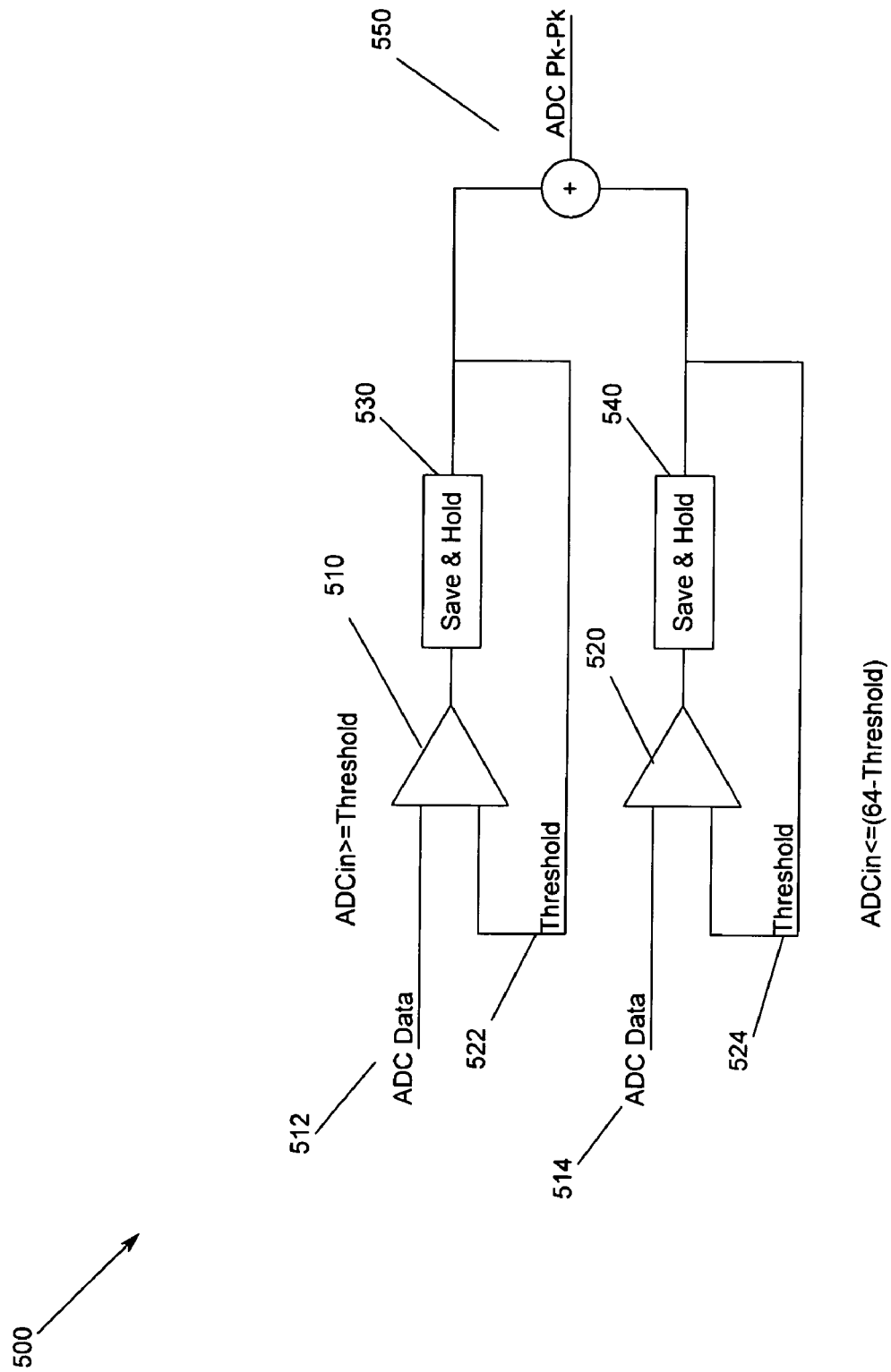
FIG. 5 illustrates the characterization engine for detecting a threshold voltage code from the ADC according to an embodiment of the present invention.

FIG. 5 illustrates a peak-to-peak detector 500 for measuring the ADC output code according to an embodiment of the present invention. During head amplitude characterization, two different input amplitudes 512, 514, as determined by the Head Amplitude DAC Low and High Codes, are generated by the DAC and input to the VGA. The input signals 512, 514 are compared to a threshold 522, 524. The output of comparators 510, 520 are provided to Save & Hold circuits 530, 540. The outputs of the Save & Hold circuits 530, 540 are used to determine the DAC peak-to-peak values 550 for determining the ADC output code. The outputs of the Save & Hold circuits 530, 540 are returned to the comparator 510, 520 as the threshold signal 522, 524.

Figure 6:
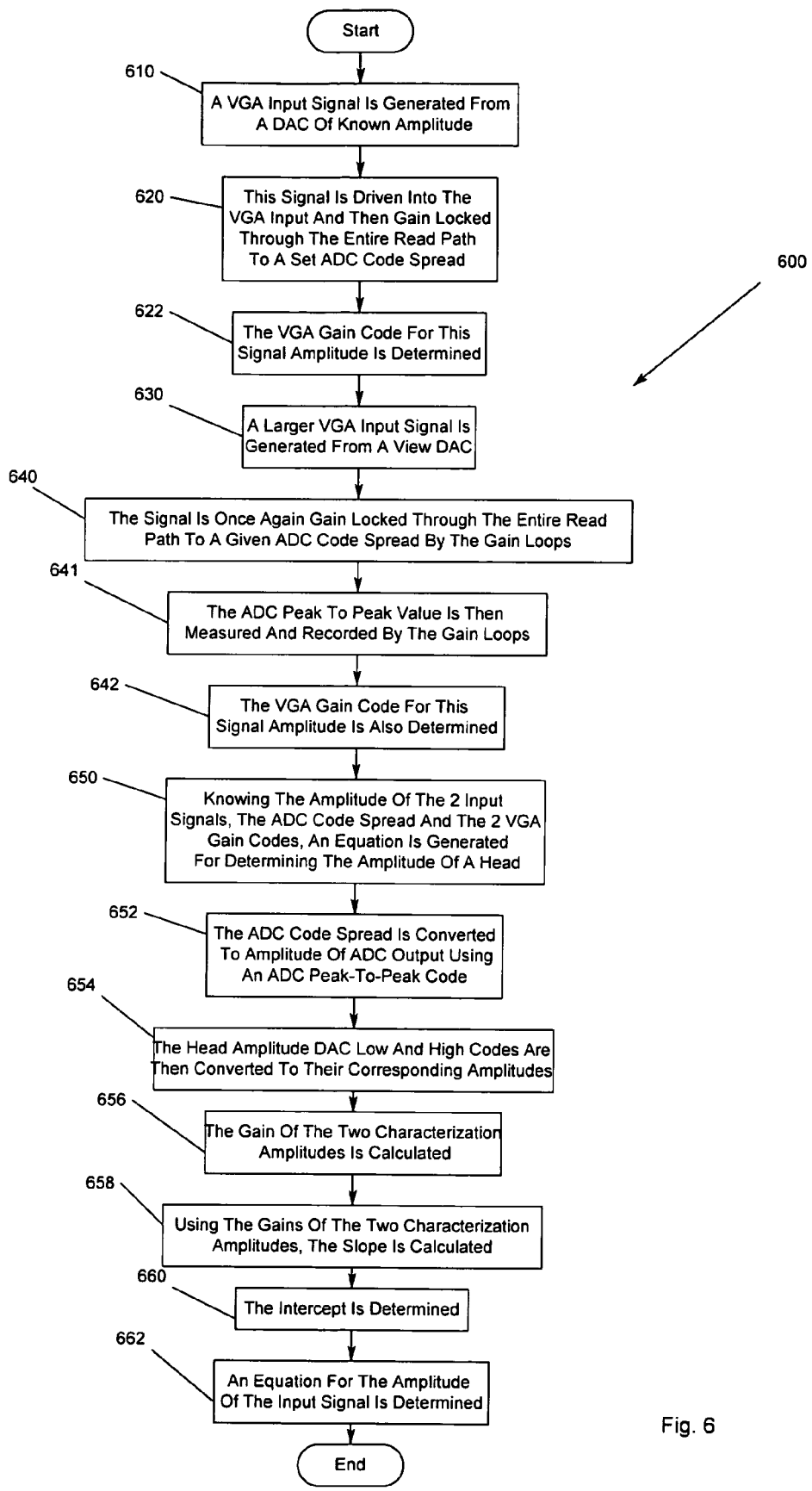
FIG. 6 is a detailed flow chart of the operations for performing the head amplitude characterization using gain loops according to an embodiment of the present invention.

FIG. 6 is a detailed flow chart 600 of the operations for performing the head amplitude characterization according to an embodiment of the present invention. First a VGA input signal is generated from a DAC of "known amplitude" 610.

This signal is driven into the VGA input and then gain locked through the entire read path to a set ADC code spread 620. This is done be allowing the gain loops to lock up the gain. The VGA gain code for this signal amplitude is determined 622. Next a larger VGA input signal is generated from a DAC 630. The signal is once again gain locked through the entire read path to a given ADC code spread 640 by the gain loops. The ADC peak to peak value is then measured and recorded by the gain loops 641. The VGA gain code for this signal amplitude is also determined 642

Knowing the amplitude of the two input signals, the ADC code spread and the two VGA gain codes, an equation is generated for determining the amplitude of a head 650. The ADC code spread is converted to amplitude of ADC output in mV using the $ADC_{peak-to-peak}$ code 652. The head amplitude DAC low and high codes are then converted to their corresponding amplitudes in mV 654. The gain, in dB, of the two characterization amplitudes is calculated 656. Using the gains of the two characterization amplitudes, the slope is calculated 658 and then the intercept is determined 660. An equation for the amplitude of the input signal in mV is determined 662.

As described above, the head amplitude characterization may be performed for example by a signal processing system 150 of FIG. 1 and/or a controller 224 of FIG. 2. The process for performing head amplitude characterization according to an embodiment of the present invention will now be described.

The ADC code spread is converted to amplitude of ADC output in mV as follows:

$$\text{Using gain loops: } Y_{ADC}=ADC_{Pk-Pk}*ADC\_LSB,$$

where the $ADC_{Pk-Pk}$ is the decimal equivalent of the value stored by the gain loops in a register.

The head amplitude DAC low and high codes are then converted to their corresponding amplitudes in mV as follows:

$$\text{InputAmp } 1=(2*DAC\text{LowCode}+1)*DAC\_LSB$$

$$\text{InputAmp } 2=(2*DAC\text{HighCode}+1)*DAC\_LSB$$

where the DAC low code is the decimal equivalent of the register selectable head amplitude DAC low code and the DAC high code is the decimal equivalent of the register selectable head amplitude DAC high code.

The gain, in dB, of the two characterization amplitudes is calculated according to:

$$\text{Gain } 1=20*\log(Y_{ADC}/\text{InputAmp } 1); \text{ and}$$

$$\text{Gain } 2=20*\log(Y_{ADC}/\text{InputAmp } 2).$$

Using the gains of the two characterization amplitudes, the slope is calculated as follows:

$$\text{slope} = \frac{Result1 - Result2}{Gain1 - Gain2}$$

where Result 1 is the decimal equivalent of head amplitude characterization Result 1, Result 2 is the decimal equivalent of head amplitude characterization Result 2, and Gain 1 and Gain 2 are as calculated in the previous operation. Then the intercept, b, is Result 1−slope*Gain 1.

The amplitude of the input signal in mV is determined according to $$\text{Amp}lX = (Y_{ADC}/10^{((VGA\ Code\ X-b-slope)/(20*Slope))}),$$

where the VGA code is the result of the gain and timing loops in normal servo or data mode.

As stated above, head amplitude characterization can be performed with analog front end configured for either read data or servo data, thereby allowing both data and servo VGA gain results to be used in calculations to find the channel's input amplitude. During head amplitude characterization, two different input amplitudes, as determined by the head amplitude DAC low and high codes, were generated by the DAC and input to the VGA, which applies gain on these signals until the ADC is locked by the gain loops. The ADC peak to peak value is measured and recorded by the gain loops.

The two characterization results, which correspond to the VGA gain for the two characterization amplitudes, together with either the data or servo VGA gain, allow a series of calculations to be performed for determining the channel input amplitude. The amplitude measurements made by issuing a read operation using taps resulting from an equalization will result in a nearly uniform data VGA gain result for any data pattern. This is because the 16-state equalization boosts signals of higher frequency and attenuates lower frequencies in the CTF and DFIR. This result works well for monitoring of head amplitude for a head re-initialization since there is little pattern dependence.

Alternate operations for measuring the head amplitude using the envelope detector in idle mode may be performed by writing the test track to the magnet length required with asynchronous magnets enabled. The idle envelope detector is enabled and synthesizer set to 10% to 20% higher data rate to over sample the readback signal. This procedure may provide repeatability of about +/−2 LSB for VGA gain of sync field.

The process illustrated with reference to FIGS. 1–6 may be tangibly embodied in a computer-readable medium or carrier, e.g. one or more of the fixed and/or removable data storage devices 188 illustrated in FIG. 1, or other data storage or data communications devices. The computer program 190 may be loaded into memory 170 to configure the processor 172 for execution of the computer program 190. The computer program 190 include instructions which, when read and executed by a processor 172 of FIG. 1, causes the devices to perform the steps necessary to execute the steps or elements of an embodiment of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A data channel, comprising:
   a variable gain amplifier (VGA) for receiving input signals and generating a VGA output;
   a digital-to-analog converter (DAC) circuit, coupled to the VGA, for providing a desired input signal to the VGA;
   a gain control loop, coupled to the VGA, for driving the VGA to gain lock the VGA to the provided desired input signal;
   an analog-to-digital converter (ADC), coupled to the VGA, for providing a digital output representing an ADC code spread in response to the VGA output; and
   a controller, coupled to the VGA, the controller driving the DAC to provide the desired input signal to the VGA and generating control signal for controlling the ADC, the controller further determining an equation for determining a read head channel amplitude by applying a high and low amplitude signal to the VGA using the DAC and obtaining the ADC code spread and gain codes associated with the high and low amplitude signals.

2. The data channel of claim 1, wherein the DAC circuit further comprises an analog processing device for providing a predetermined output signal to the VGA in response to a DAC input.

3. The data channel of claim 2, wherein the analog processing device comprises an analog switch for providing a selection between input signals.

4. The data channel of claim 3, wherein the selection between input signals provides an output signal having predetermined high and low amplitudes.

5. The data channel of claim 1, wherein the VGA applies gain in response to the low and high amplitude signals from the DAC until the output of the ADC reaches a level determined by a predetermined $ADC_{peak-to-peak}$ code.

6. The data channel of claim 1 further comprising a continuous time filter, the continuous time filter enables head amplitude characterization to be performed once with data filtering and again with servo filtering to generate both data VGA gain values and servo VGA gain values, the data VGA gain values and servo VGA gain values being used to determine the input amplitude of the data channel.

7. The data channel of claim 1, wherein the controller converts the ADC code spread to an amplitude of the ADC output using the $ADC_{peak-to-peak}$ code.

8. An analog front end for a read channel, comprising:
   an analog processing circuit for receiving read signals;
   a digital-to-analog converter (DAC), coupled to the analog processing circuit for providing high and low control signals to the analog processing circuit for producing predetermined analog processing circuit output signals;
   a variable gain amplifier (VGA), coupled to the analog processing circuit, for processing the predetermined analog processing circuit output signals using VGA gain codes for producing amplified signals;
   an analog-to-digital converter (ADC), coupled to the VGA, for producing an ADC code spread in response to the amplified signals;
   gain control loop, coupled to the VGA, for driving the VGA to gain lock the VGA to the input signals from the DAC;
   memory for storing an amplitude of two input signals, the ADC code spread associated with the two input signals and two VGA gain codes from the gain control loop associated with the two input signals and corresponding high and low DAC control signals; and a processor, coupled to the memory, for calculating an amplitude of any input signal using an equation derived by applying a high and low amplitude signal to the VGA using the DAC and obtaining the ADC code spread associated with the high and low amplitude signals and the two VGA gain codes associated with the high and low amplitude signals obtained from the gain control loop.

9. The data channel of claim 8, wherein the analog processing circuit selects between input signals according to a selection signal provided by the processor.

10. The data channel of claim 8 further comprising a continuous time filter, the continuous time filter enables head amplitude characterization to be performed once with data filtering and again with servo filtering to generate both data VGA gain values and servo VGA gain values, the data VGA gain values and servo VGA gain values being used to determine the input amplitude of the data channel.

11. The data channel of claim 8, wherein the processor converts the ADC code spread to an amplitude of the ADC output using the $ADC_{peak-to-peak}$ code.

12. A magnetic storage device, comprising:
a magnetic storage medium for recording data thereon;
a motor for moving the magnetic storage medium;
a head for reading and writing data on the magnetic storage medium;
an actuator for positioning the head relative to the magnetic storage medium; and
a data channel for processing encoded signals form the magnetic storage medium, the data channel comprising:
  a variable gain amplifier (VGA) for receiving input signals and generating a VGA output;
  a digital-to-analog converter (DAC) circuit, coupled to the VGA, for providing a desired input signal to the VGA;
  gain control loop, coupled to the VGA, for driving the VGA to gain lock the VGA to the provided desired input signal;
  an analog-to-digital converter (ADC), coupled to the VGA, for providing a digital output representing an ADC code spread in response to the VGA output; and
  a controller, coupled to the VGA, the controller driving the DAC to provide the desired input signal to the VGA and generating control signal for controlling the ADC, the controller further determining an equation for determining a read head channel amplitude by applying a high and low amplitude signal to the VGA using the DAC and obtaining the ADC code spread and gain codes associated with the high and low amplitude signals.

13. The data channel of claim 12, wherein the DAC circuit further comprises an analog processing device for providing a predetermined output signal to the VGA in response to a DAC input.

14. The data channel of claim 13, wherein the analog processing device comprises an analog switch for providing a selection between input signals.

15. The data channel of claim 14, wherein the selection between input signals provides an output signal having predetermined high and low amplitudes.

16. The data channel of claim 12, wherein the VGA applies gain in response to the low and high amplitude signals from the DAC until the output of the ADC reaches a level determined by a predetermined $ADC_{peak-to-peak}$ code.

17. The data channel of claim 12 further comprising a continuous time filter, the continuous time filter enables head amplitude characterization to be performed once with data filtering and again with servo filtering to generate both data VGA gain values and servo VGA gain values, the data VGA gain values and servo VGA gain values being used to determine the input amplitude of the data channel.

18. The data channel of claim 12, wherein the controller converts the ADC code spread to an amplitude of the ADC output using the $ADC_{peak-to-peak}$ code.

19. A data channel, comprising:
means for amplifying an input signal;
means, coupled to the means for amplifying, for providing a desired input signal to the means for amplifying;
means, coupled to the means for amplifying, for driving the means for amplifying to gain lock the means for amplifying to the provided desired input signal;
means, coupled to the means for amplifying, for providing a digital output representing an ADC code spread in response to the amplified input signal; and
means, coupled to the means for amplifying, for driving the means for providing a desired input signal and for generating control signals for controlling the means for providing a digital output, the means for providing a desired input signal and for generating control signals determining an equation for determining a read head channel amplitude by applying a high and low amplitude signal to the means for amplifying using the means for providing a desired input signal and obtaining the ADC code spread and gain codes associated with the high and low amplitude signals.

20. A magnetic storage device, comprising:
means for recording data thereon;
means for moving the means for recording data;
means for reading and writing data on the means for recording data;
means for positioning the means for reading and writing relative to the means for recording data; and
means for processing encoded signals from the means for recording, the means for processing encoded signals comprising:
  means for amplifying an input signal;
  means, coupled to the means for amplifying, for providing a desired input signal to the means for amplifying;
  means, coupled to the means for amplifying, for driving the means for amplifying to gain lock the means for amplifying to the provided desired input signal;
  means, coupled to the means for amplifying, for providing a digital output representing an ADC code spread in response to the amplified input signal; and
  means, coupled to the means for amplifying, for driving the means for providing a desired input signal and for generating control signals for controlling the means for providing a digital output, the means for providing a desired input signal and for generating control signals determining an equation for determining a read head channel amplitude by applying a high and low amplitude signal to the means for amplifying using the means for providing a desired input signal and obtaining the ADC code spread and gain codes associated with the high and low amplitude signals.

* * * * *